(12) United States Patent  
Obligacion

(10) Patent No.: US 8,745,371 B2  
(45) Date of Patent: Jun. 3, 2014

(54) UNIFIED NETWORK ARCHITECTURE HAVING STORAGE DEVICES WITH SECURE BOOT DEVICES

(75) Inventor: Eric T. Obligacion, Montgomery Village, MD (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/339,446

(22) Filed: Dec. 29, 2011

(65) Prior Publication Data

US 2013/0173904 A1   Jul. 4, 2013

(51) Int. Cl.
*H04L 9/00* (2006.01)

(52) U.S. Cl.
USPC ........... 713/150; 713/151; 713/160; 713/168; 713/189; 713/193; 713/175; 713/2; 380/44; 709/227; 709/217; 709/326; 707/652; 714/6.1; 726/4

(58) Field of Classification Search
USPC ......... 713/150, 151, 160, 168, 189, 193, 175, 713/2; 709/227, 217, 326; 707/652; 714/6.1; 380/44; 726/4
See application file for complete search history.

(56) References Cited

U.S. PATENT DOCUMENTS

| | | | | |
|---|---|---|---|---|
| 2010/0299313 | A1* | 11/2010 | Orsini et al. | 707/652 |
| 2011/0246817 | A1* | 10/2011 | Orsini et al. | 714/6.1 |
| 2012/0072723 | A1* | 3/2012 | Orsini et al. | 713/165 |
| 2012/0084545 | A1* | 4/2012 | Farina et al. | 713/2 |
| 2012/0084562 | A1* | 4/2012 | Farina et al. | 713/168 |
| 2012/0084566 | A1* | 4/2012 | Chin et al. | 713/175 |
| 2012/0084838 | A1* | 4/2012 | Inforzato et al. | 726/4 |
| 2012/0133818 | A1* | 5/2012 | Miyamori et al. | 348/335 |
| 2012/0331088 | A1* | 12/2012 | O'Hare et al. | 709/214 |
| 2013/0013931 | A1* | 1/2013 | O'Hare et al. | 713/189 |
| 2013/0061029 | A1* | 3/2013 | Huff et al. | 713/2 |

* cited by examiner

*Primary Examiner* — Kambiz Zand
*Assistant Examiner* — Tongoc Tran
(74) *Attorney, Agent, or Firm* — Richard J. Gregson

(57) ABSTRACT

Devices located on a back end of a web application in a private cloud may establish secure communications to other back end devices or client devices with a secure boot device integrated in the back end device. The secure boot device enables the back end component to cryptographically split data and encrypt data for transmission to other devices through a secure communications link. The secure communications link may improve security on private cloud networks. Further the secure communications link may improve security to allow back end devices to be located remote to other back end devices.

20 Claims, 14 Drawing Sheets

UNIFIED NETWORK ARCHITECTURE HAVING STORAGE DEVICES WITH SECURE BOOT DEVICES

The instant disclosure relates to network communications. More specifically, this disclosure relates to securing network communications.

BACKGROUND

Security is conventionally maintained in organizations by segregating physical networks used by each group of users. This acts to restrict access to data available on computers and databases used in such networks. For example, the physical segregation prevents a user in engineering from gaining access to data in the payroll department's network and vice versa. While separate local network infrastructures help to maintain security of data, superfluous equipment and maintenance is required to maintain these segregated networks. This increases expenses and complexity to the data infrastructures of organizations.

Regardless of the organizational structure of networks used in commercial, governmental, and other settings, there is an ever increasing security concern that sensitive data transmitted or stored on local networks will be accessed by an unauthorized individual or accidentally accessed or disclosed outside of a group of users, which would compromise the security of the data. Whether a security threat is intentional or unintentional, transmitting data exclusively in one security level partitioned network or another does not protect the data if it is in plaintext format. This is because even strict physical segregation of a network by security level is no guarantee that data will not be disseminated to end-users outside that security level.

SUMMARY

According to one embodiment, a method includes reading information from a secure boot device. The method also includes executing an operating system contained on the secure boot device. The method further includes establishing a secure connection to a server. The method also includes receiving a request for data from the server. The method further includes cryptographically splitting the requested data. The method also includes transmitting the cryptographically split data to the server.

According to another embodiment, a computer program product includes a non-transitory computer readable medium having code to read information from a secure boot device. The medium also includes code to execute an operating system contained on the secure boot device. The medium further includes code to establish a secure connection to a server. The medium also includes code to receive a request for data from the server. The medium further includes code to cryptographically split the requested data. The medium also includes code to transmit the cryptographically split data to the server.

According to a further embodiment, an apparatus includes a processor, a memory coupled to the processor, and a secure boot device coupled to the processor. The processor is configured to read information from the secure boot device. The processor is also configured to execute an operating system contained on the secure boot device. The processor is further configured to establish a secure connection to a server. The processor is also configured to receive a request for data stored in the memory from the server. The processor is further configured to cryptographically split the requested data. The processor is also configured to transmit the cryptographically split data to the server.

According to one embodiment, a system includes a switch. The system also includes a first storage device connected to the switch over a first communications link through a first communications protocol. The system further includes a secure boot device connected to the first storage device. The system also includes a second storage device connected to the switch over a second communications link through a second communications protocol.

According to another embodiment, a method includes connecting a first storage device to a network through a first connection. The method also includes connecting a second storage device to a network through a second connection, in which at least one of the first connection and the second connection comprises a fibre channel over Ethernet (FCoE) connection. The method further includes connecting a secure boot device to the first storage device, in which the first storage device accesses the secure boot device to establish a secure connection with a server.

According to a further embodiment, an apparatus includes a processor, a memory connected to the processor, a secure boot device connected to the processor, and a network adapter connected to the processor. The processor is configured to establish secure communications through the network adapter with the secure boot device. The processor is also configured to communicate through the network adapter with a fibre channel over Ethernet (FCoE) protocol.

According to one embodiment, a method includes receiving a request, through a secure communications link, from a user for a file in a logical partition. The method also includes identifying a physical location for the file. The method further includes obtaining a copy of the file. The method also includes transferring the copy of the file, through the secure communications link, to the user.

According to another embodiment, a computer program product includes a non-transitory computer readable medium having code to receive a request, through a secure communications link, from a user for a file in a logical partition. The medium also includes code to identify a physical location for the file. The medium further includes code to obtain a copy of the file. The medium also includes code to transfer the file, through the secure communications link, to the user.

According to a further embodiment, an apparatus includes a processor, a memory connected to the processor, a secure boot device connected to the processor, and a first network adapter connected to the processor. The processor is configured to receive a request, at the first network adapter through a secure communications link, from a user for a file in a logical partition. The processor is also configured to identify a physical location for the file. The processor is further configured to store a copy of the file in the memory. The processor is also configured to transfer the copy of the file, through the secure communications link with the secure boot device, to the user.

According to one embodiment, a method includes receiving a command, at a first storage device, to clone a second storage device. The method also includes copying data from the second storage device to the first storage device. The method further includes re-keying the first storage device with an encryption key matching an encryption key of the second storage device. The method also includes establishing, by the first storage service, secure communications with the encryption key.

According to another embodiment, a computer program product includes a non-transitory computer readable medium having code to receive a command, at a first storage device, to clone a second storage device. The medium also includes code to copy data from the second storage device to the first storage device. The medium further includes code to re-key the first storage device with an encryption key matching an encryption key of the second storage device. The medium also includes code to establish, by the first storage service, secure communications with the encryption key.

According to a further embodiment, an apparatus includes a processor, a memory connected to the processor, a secure boot device connected to the processor, and a network adapter connected to the processor. The processor is configured to receive a command, through the network adapter, to clone a second storage device. The processor is also configured to copy data from the second storage device to the memory. The processor is further configured to re-key the secure boot device with an encryption key matching an encryption key of the second storage device. The processor is also configured to establish, through the network adapter, secure communications with the encryption key.

According to one embodiment, a method includes establishing a secure communications link between a first storage device and a second storage device. The method also includes generating a data stream of data stored on the first storage device. The method further includes splitting the data stream cryptographically. The method also includes transmitting the cryptographically split data.

According to another embodiment, a computer program product includes a non-transitory computer readable medium having code to establish a secure communications link between a first storage device and a second storage device. The medium also includes code to generate a data stream of data stored on the first storage device. The medium further includes code to split the data stream cryptographically. The medium also includes code to transmit the cryptographically split data.

According to a further embodiment, an apparatus includes a processor, a memory connected to the processor, a secure boot device connected to the processor, and a network adapter connected to the processor. The processor is configured to establish a secure communications link between a first storage device and a second storage device with the secure boot device. The processor is also configured to generate a data stream of data stored on the first storage device. The processor is further configured to split the data stream cryptographically. The processor is also configured to transmit the cryptographically split data through the network adapter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Methods and systems described below improve network security by securing data from both casual and sophisticated eavesdroppers. Further, the disclosure outlines methods and systems for improving the flexibility of networks without compromising security in the network. For example, networks may be partitioned logically without affecting the user. In another example, network devices, such as storage devices, may be located remote to a private cloud network and still have secure access to resources within the private cloud network.

Figure 1:
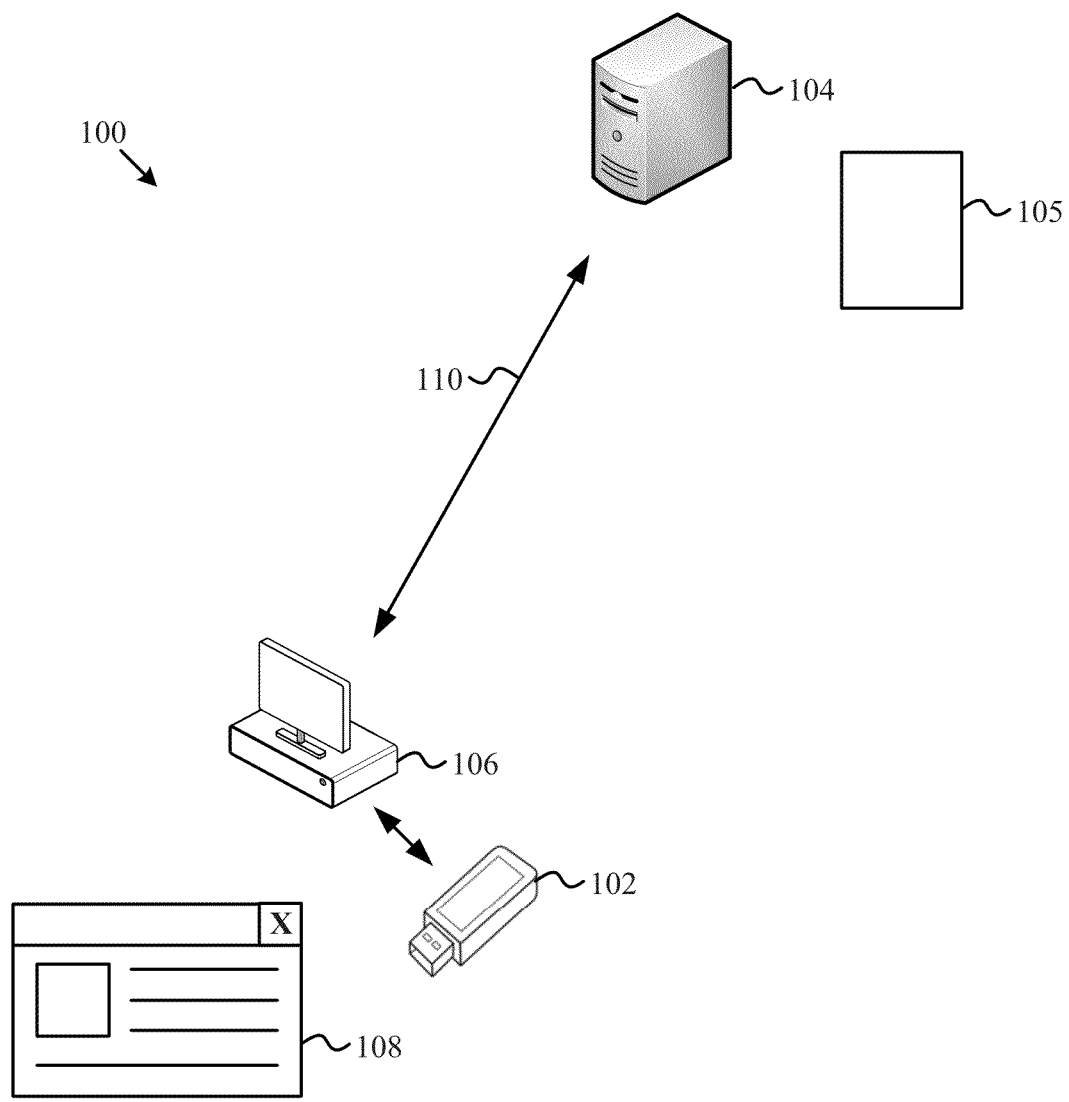
FIG. 1 is a block diagram illustrating a client with a secure boot device for accessing a secure web application over an unsecure communications link according to one embodiment of the disclosure.

FIG. 1 is a block diagram illustrating a client with a secure boot device for accessing a secure web application over an unsecure communications link according to one embodiment of the disclosure. A distributed system 100 may include a server 104, such as a database server, an application server, or a file server. The distributed system 100 may also include a remote computing systems 106, which may be under control by a different operator than the server 104. In alternative embodiments, the system 100 may include more than one server 104 and/or one computing system 106. Additionally, additional remote computing systems may include mobile devices such as smart phones, cellular phones, laptop computers, and table computers.

In certain embodiments, the remote computing system 106 may interact with a user through a web page 108, or a dedicated application. The web page 108 may display to a user details of a transaction 105 occurring between the remote computing system 106 and the server 104. For example, the transaction 105 may be a financial transaction or other transaction involving secure communications. A secure connection 110 may be created between the remote computing system 106 and the server 104 to allow transmission of details regarding the transaction 105 over a public network, such as the internet.

The secure connection 110 may be created when the remote computing system 106 boots into an operating system stored on a secure boot device 102 connected to the remote computing system 106. This secure boot device 102 may store a trusted version of an operating system software and secure communications software for use when the remote computing system 106 establishes the secure connection 110 with the server 104. According to one embodiment, the secure boot device 102 may correspond to a universal system bus (USB) storage device. The remote computing system 106 may boot a USB-bootable operating system from the secure boot device 102. The USB-bootable operating system may provide software capable of communicating with the server 104 over the secure connection 110 and may include software programs capable of cryptographic splitting of data, such as in the methods described below with reference to FIGS. 2-4.

The secure boot device 102 may additionally provide secure storage that prevents tampering with the software loaded onto the device. This secure storage may be accessed and/or verified by the server 104 during initiation and/or communications over the secure connection 110. The secure boot device 102 may also include other trusted software modules that may limit the possible operations that a remote computing system 106 may perform when the remote computing system 106 boots from the secure boot device 102.

For example, the software modules may be configured to prevent the remote computing system 106 from accessing on-secured network resources by limiting access to communication channels, such as Bluetooth, serial connections, and/or other peripheral device connections. The software modules may further prevent the remote computing system 106 from executing application programs stored in a memory of the system itself, such as a local hard drive installed in the remote computing system 106. By operating the remote computing system 106 from the secure boot device 102, the transactions 105 may be trusted by the user at the client computer system 106 and the server 104.

According to one embodiment, the secure boot device 102 may also include an identity module for providing authentication information to the server 104. For example, the secure boot device 102 may include a smart card (not shown) or a smart card reader (not shown) where a user may insert their individual identification information. According to another embodiment, upon establishment of the secure connection 110 between the remote computing system 106 and the server 104, the user of the remote computing system 106 may be authenticated using identification information stored upon secure storage, such as a community-of-interest key.

The secure connection 110 may include multiple paths for transmission of data between the remote computing system 106 and the server 104. The paths may be fixed paths or random paths generated by conventional packet-routing networks. Multiple paths for data over the secure connection 110 may improve security by reducing the likelihood of eavesdropping on the secure connection 110.

Figure 2:
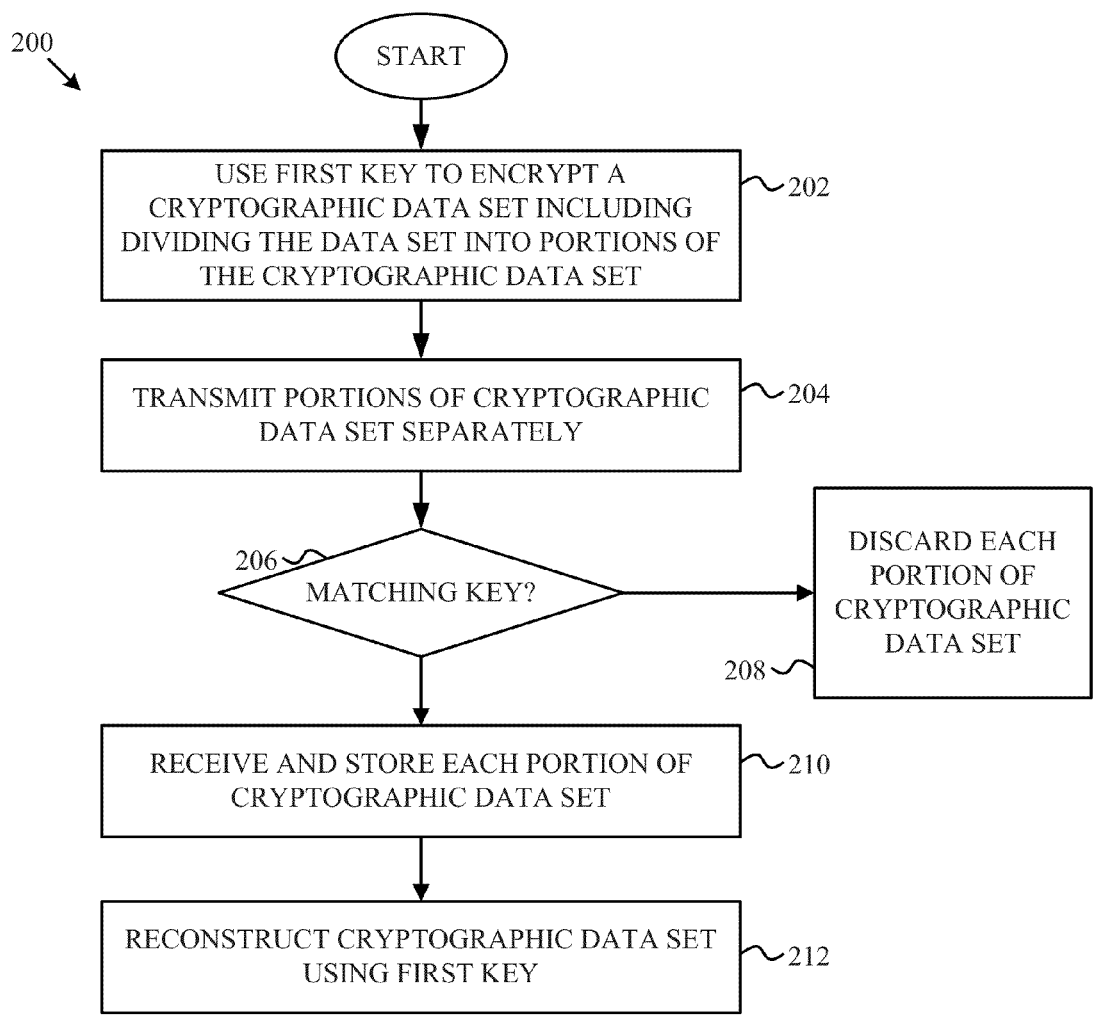
FIG. 2 is a flow chart illustrating an exemplary method for transmitting secure data over an unsecure communications link according to one embodiment of the disclosure.

FIG. 2 is a flow chart illustrating an exemplary method for transmitting secure data over an unsecure communications link according to one embodiment of the disclosure. A method 200 may be implemented in a software module included in the secure boot device 102 of FIG. 1. The method 200 securely transmits cryptographic data set among logically partitioned data paths. The cryptographic data set may include, for example, one or more encryption keys, filters, and other information useable at an endpoint of a communications link to enable that device to establish a secure communication with a remote system (e.g., another endpoint, a gateway, or any other remote device configured to receive or transmit cryptographically split communication).

The method 200 begins at block 202 with dividing a cryptographic data set into a plurality of portions. Tag values may be assigned to each portion of the cryptographic data set. Each portion may encapsulated into separate packets, frames, cells, or another unit of data depending on the type of communications link. At block 204, the portions of cryptographic data set may be transmitted from an network interface card of a computing device, such as the client computer system 102 of FIG. 1.

At block 206, each portion of cryptographic data is received by a target computing device, such as the server 104 of FIG. 1. According to one embodiment, the packets received include a new encryption key identifier instructing the target computing device to change keys. In another embodiment, packets received by the target computing device do not include the key identifier. Instead, the target computing device restores a cryptographic data portion encapsulated in a payload portion of the packet using an encryption key stored locally on the target computing device. In some embodiments, the target computing device may store multiple encryption keys, such as for communicating with multiple devices or for rotating encryption keys during a single transaction over a secure communications link.

When no encryption key matches the received data at block 206, the method 200 continues to block 208. At block 208, packets not matching the encryption key may be discarded, erased, dropped, and/or ignored. Block 208 may be reached when a user of does not have authorization to view a message, because the user (or the user's computing device) lacks the required encryption key, or if the transmitting computing device is not included in a listing of permitted devices at the target device.

When a matching encryption key is identified at block 206, then each portion of the cryptographic data set is temporarily stored for eventual reassembly at block 210. At this point a tunnel can be established between the sending and receiving computing devices.

At block 212, the cryptographic data set may be decrypted. Then, the cryptographic data set may be reconstructed by decrypting each portion of the cryptographic data set using the encryption key identified at block 210 and reassembling the decrypted cryptographic data sets. Once all portions of the cryptographic data set are received, the cryptographic data set may be completely reassembled.

Figure 3:
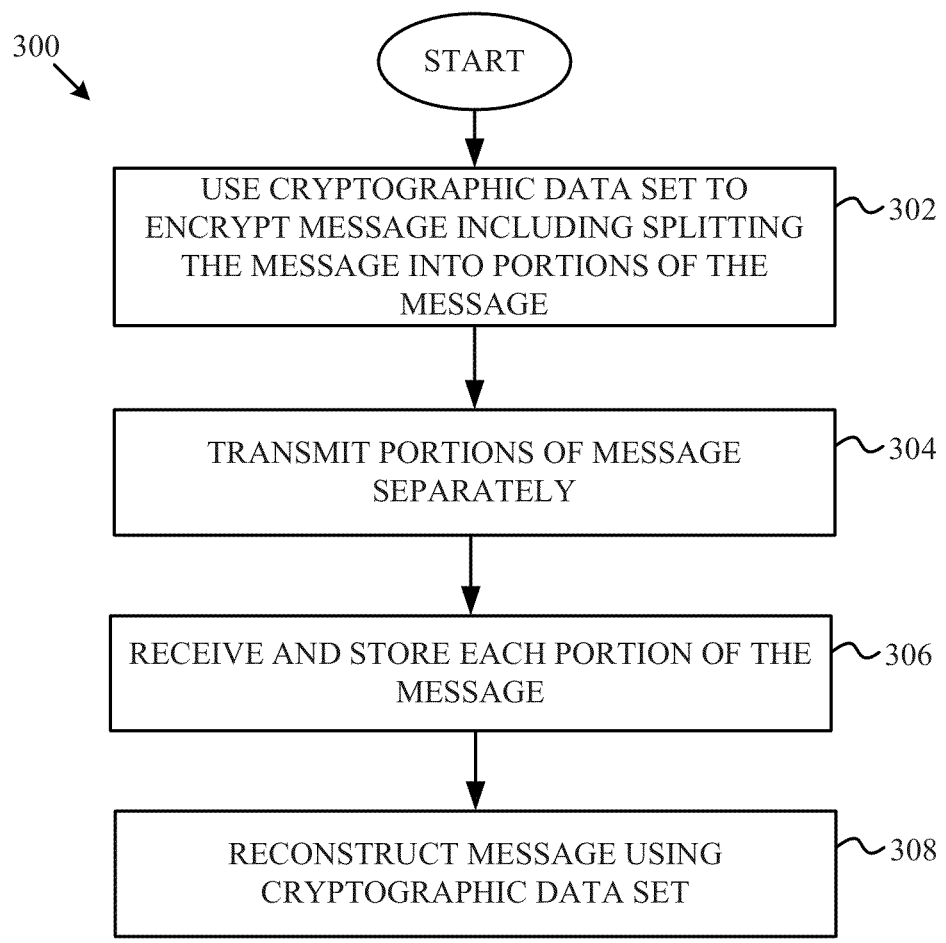
FIG. 3 is a flow chart illustrating an exemplary method for transmitting secure data over an unsecure communications link according to another embodiment of the disclosure.

FIG. 3 is a flow chart illustrating an exemplary method for transmitting secure data over an unsecure communications link according to another embodiment of the disclosure. A method 300 may allow for securely transmitting a message among logically partitioned data paths. The method 300 may be executed in a software module after a secure communications link has been created. At block 302, a message, or a set of data, may be divided into portions and tag values may be assigned to each portion of the set. Each portion may be encapsulated in separate packets using a cryptographic data set at the sending computing device. According to one embodiment, each tag may include metadata indicating a traffic path a particular portion of a message is to follow to a target computing device within a network.

At block 304, the portions of cryptographic data set are transmitted from network interface of a computing device. According to one embodiment, the different portions of data may be transmitted on different data communication paths. Tag values assigned to each portion of cryptographic data may correspond to a particular communication data path, to transmit the portion of cryptographic data set. For example, a first portion may be transmitted over a communications link towards a first gateway, and a second portion may be transmitted over a communications link towards a second gateway. The portions may be transmitted from a single communications link in different paths, or the portions may be transmitted over two different communications links to achieve different paths. At block 306, each portion of the message sent is received and temporarily stored for later reassembly.

At block 308, the message may be reconstructed by decrypting each portion of the message and reassembling the portions to recreate the cryptographic data set. When all portions of the message are received, it is possible to fully reassemble the message in a usable form on the target computing device.

Figure 4:
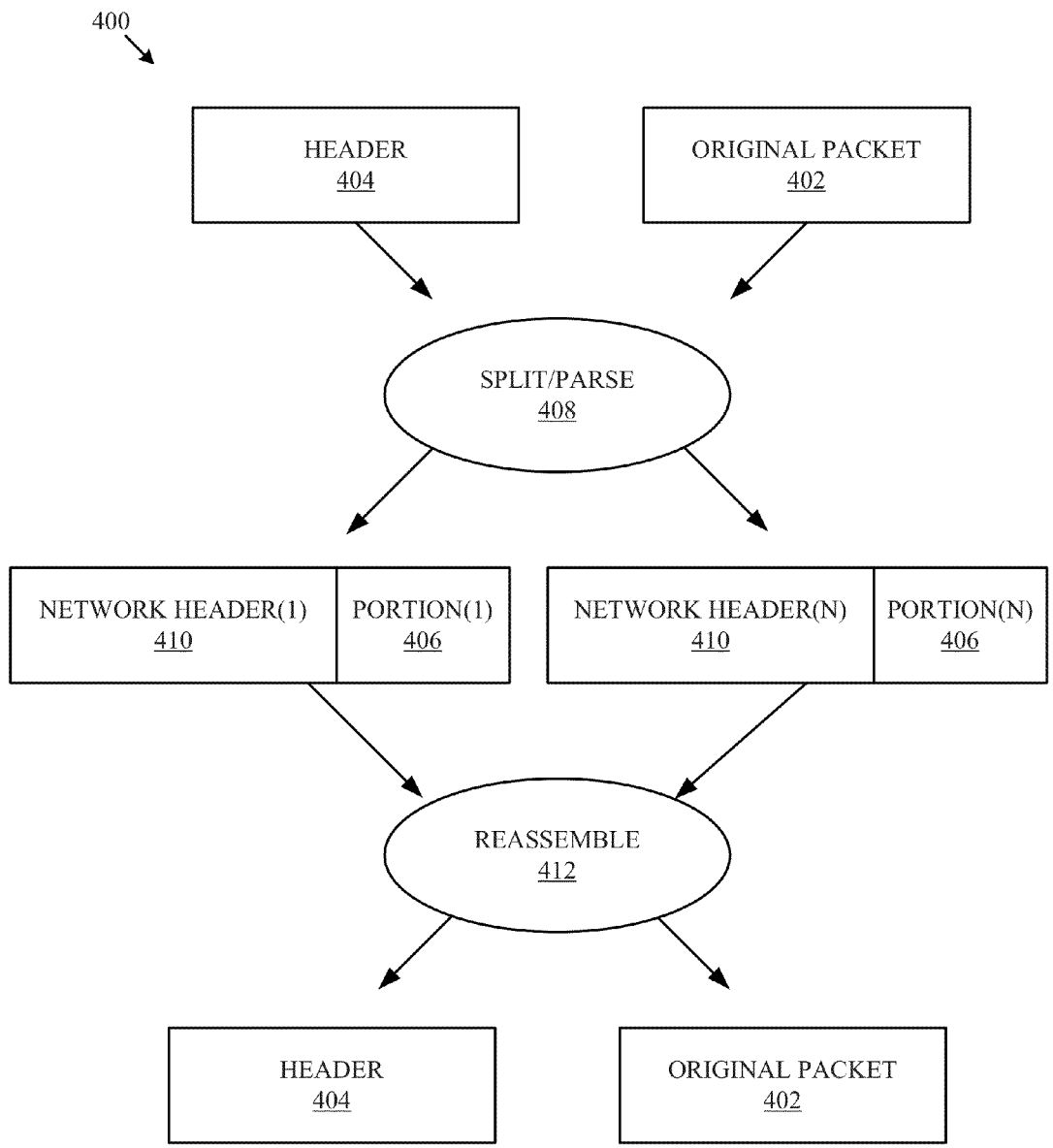
FIG. 4 is a block diagram illustrating an exemplary method for splitting and reassembling secure data according to one embodiment of the disclosure.

FIG. 4 is a block diagram illustrating an exemplary method for splitting and reassembling secure data according to one embodiment of the disclosure. An original message 402 is combined with a header 404 and split into data portions 406, by a splitting function 408. The splitting function 408 may also encrypt each of the data portions 406, such that each of the data portions 406 may contain an obfuscated portion of the original message 402. Each of the data portions 406 may then be appended with network layer header 410. The network layer header 410 of each of the data portions 406 may identify the set of data to which the data portion 406 belongs. The data portions 406 may then be passed from a first computing system to a second computing system through different network paths. The second computing system may reassemble the original message 402 with a reassembly function 412. According to one embodiment, the splitting function 408 and the reassembly function 412 may be performed, for example, by a security engine implemented in a software module or in computer hardware. The splitting function 408 and the reassembly function 412 may implement encryption, such as AES-256 encryption.

Figure 5:
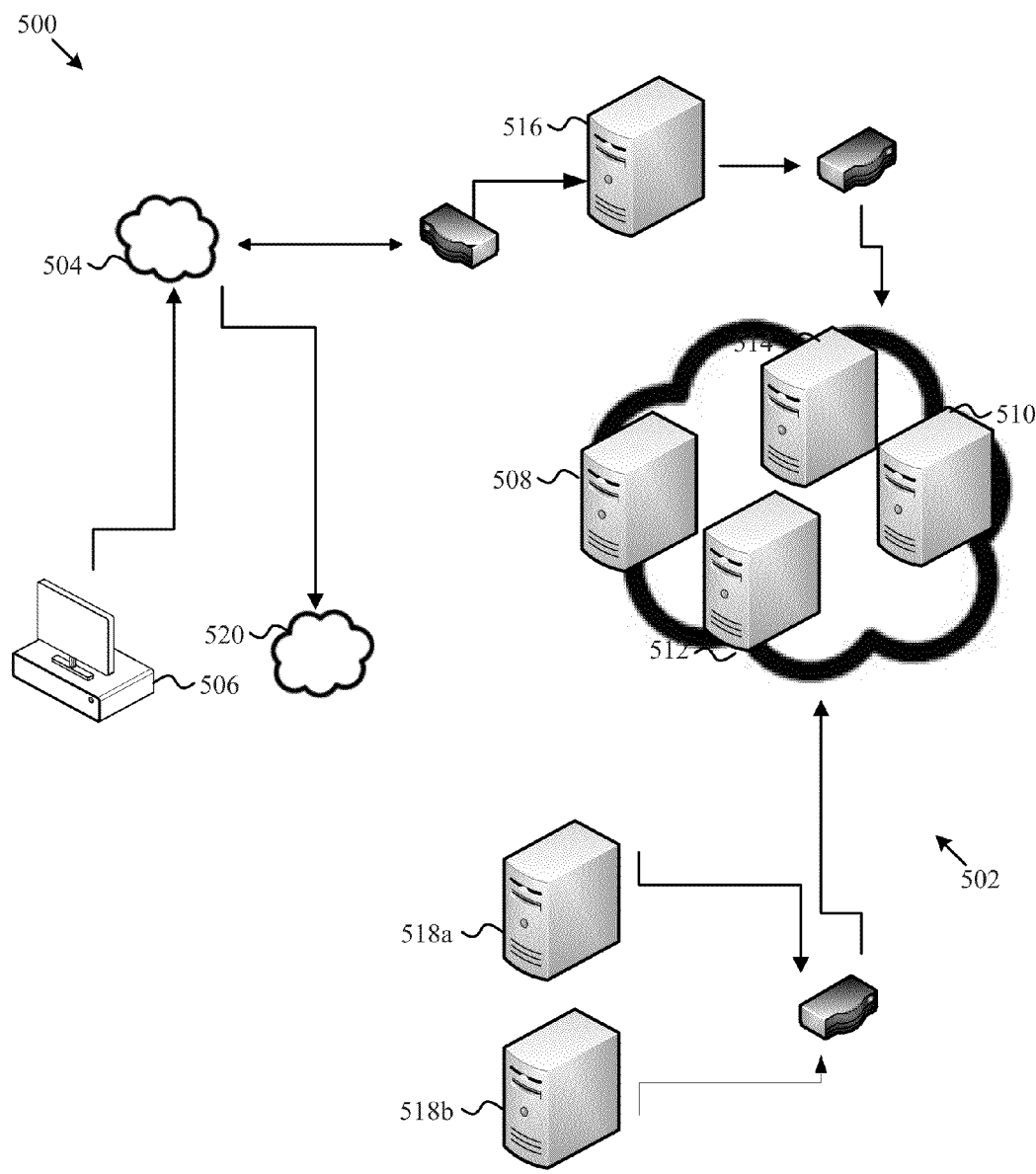
FIG. 5 is a block diagram illustrating a network having a client with a secure boot device according to one embodiment of the disclosure.

FIG. 5 is a block diagram illustrating a network including a client with a secure boot device according to one embodiment of the disclosure. A network 500 provides for communication over a clear text network, a virtual private network, and/or secure connections. A user at a client device 506 may connect to a private cloud 502, such as a corporate network, via a public network 504, such as the internet. The connection to the private cloud through the public network 504 may be secured through a virtual private network (VPN) connection and/or cryptography as described above with reference to FIGS. 2-4. The client device 506 of the network 500 may be configured to connect to a private cloud 502 with an adapter capable of cryptographic splitting.

The private cloud 502 may include servers such as a DHCP server 508, a domain server 510, a stealth server 512, and an application server 514, such as an Exchange server. Other network resources may be included in the virtual private network as well. From the internet 504, the private cloud 502 may be accessed through a VPN server 516 or a secure appliance 518a-b. Additionally, one or more public internet sites 520 may be available to the client device 506 through the public network 504.

The stealth technology implemented on the client computer device 106 by the boot device 102 may be implemented in storage devices in the back end of a secure web application. Implementing the stealth technology for transmitting data securely over unsecured communications links improves security in the back end services. For example, an eavesdropper present in the data center hosting the back end may no longer be able to eavesdrop on data transmitted in the back end. Further, with stealth technology implemented in back end components, the back end components may be hosted at various locations or on various networks without affecting the security of the data.

Figure 6:
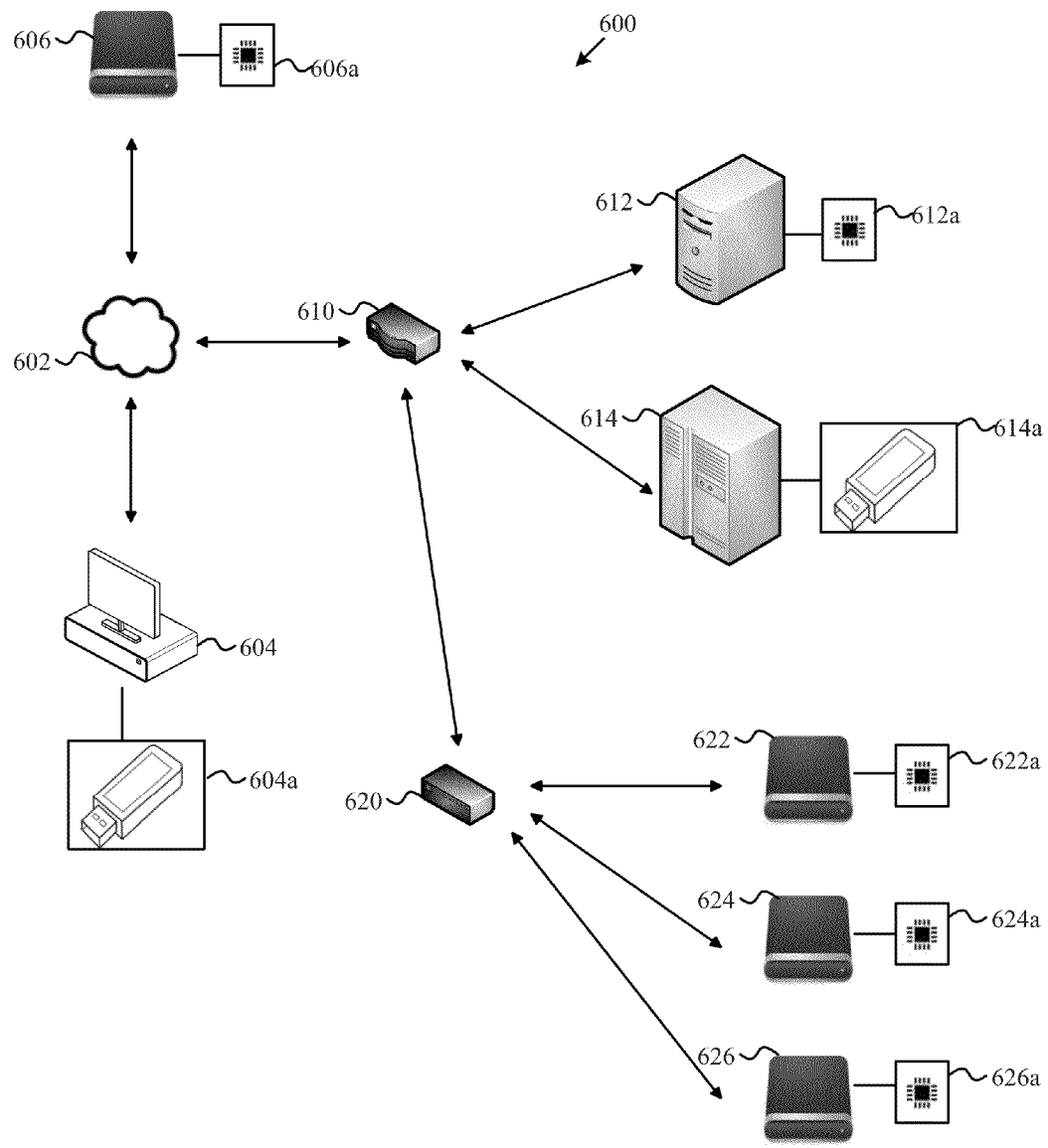
FIG. 6 is a block diagram illustrating a back end of a secure web application according to one embodiment of the disclosure.

FIG. 6 is a block diagram illustrating a back end of a secure web application according to one embodiment of the disclosure. A network 600 includes a client computing device 604 coupled to a secure boot device 604a, such as a USB flash drive. The client computing device 604 is coupled through a public network 602, such as the Internet, to a web application executing on a server 612 and/or a mainframe server 614. According to one embodiment, a web application may execute on the server 612 and access data in a database on the mainframe server 614. A router 610 separates a secure portion of the network 600, including the servers 612 and 614, from the public network 602. The server 612 and 614 may be connected to secure boot devices 612a and 614a, respectively. The secure boot devices may be integrated as a processor, such as with the secure boot device 612a connected to the server 612. The secure boot devices may also be external devices, such as with the secure boot device 614a connected to the server 614.

A hub 620 may be coupled to the router 610 for connecting additional devices to the secure network, including storage devices 622, 624, and 626. Each of the storage devices 622-626 may also be connected to a secure boot device 622a-626a, respectively. The secure boot devices may be modified for operation on the storage devices 622-626. For example, the secure boot devices 622a-626a may include different operating system components and/or security components than the secure boot devices 612a, 614a, and 604a. The different components may be tailored to execute on the different hardware available in the storage devices 622-626 than available on the servers 612-614 and the client computing device 604.

Additionally, a remote storage device 606 may be coupled to the public network 602. The remote storage device 606 may also include stealth technology embedded in a boot device 606a connected to or integrated in the remote storage device 606. The boot device 606a may allow the remote storage device 606 to establish a secure connection to the servers 612 and 614 located on a secure network behind the router 610. Thus, the remote storage device 606 may be available to applications executing on the servers 612-614 similar to the storage device 622-626, despite being located remote to the servers 612-614. According to one embodiment, the remote storage device 606 may be an auxiliary device to supplement the storage devices 622-626 when demand on the storage devices 622-626 exceeds their capacity. In another embodiment, the remote storage device 606 may be a backup device to replace the storage devices 622-626 during failures or maintenance of the storage devices 622-626.

Figure 7:
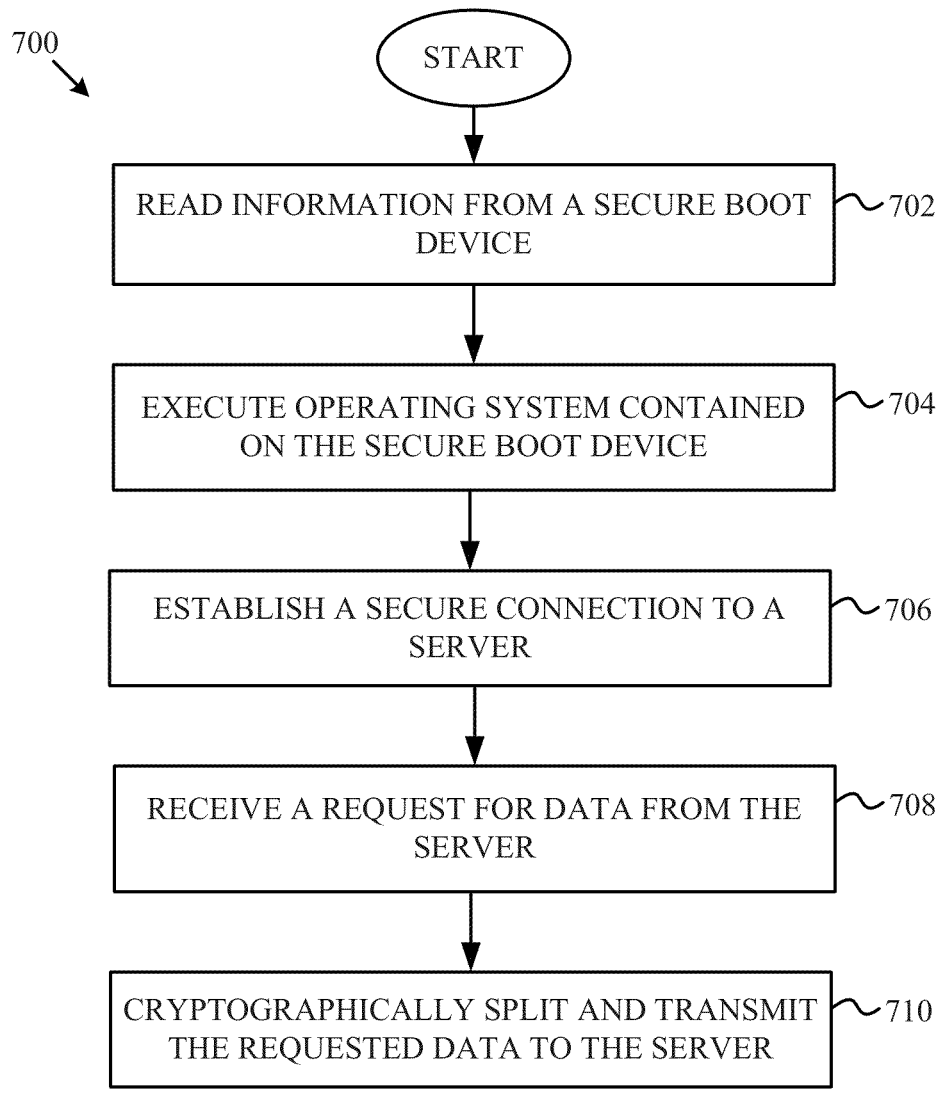
FIG. 7 is a flow chart illustrating an exemplary method for transmitting data securely between storage devices in the back end according to one embodiment of the disclosure.

Back end devices, located in the secure network or connected to the secure network, having secure boot devices may operate on data over communications links as described for a client device with reference to FIGS. 2-4. That is, the back end devices may cryptographically split data and transmit the data across different network paths. A method for establishing the communications link between a back end device having a secure boot device is described with reference to FIG. 7. FIG. 7 is a flow chart illustrating an exemplary method for transmitting data securely between storage devices in the back end according to one embodiment of the disclosure.

A method 700 begins at block 702 with a back end component, such as a storage device or a server, reading information from the secure boot device. At block 704, the back end component launches an operating system contained on the secure boot device. At block 706, the back end component establishes a secure connection to a server. At block 708, the back end component receives a request for data transmission to the server, and at block 710, the back end component cryptographically splits the requested data and transmits the data over the secure connection.

Figure 8:
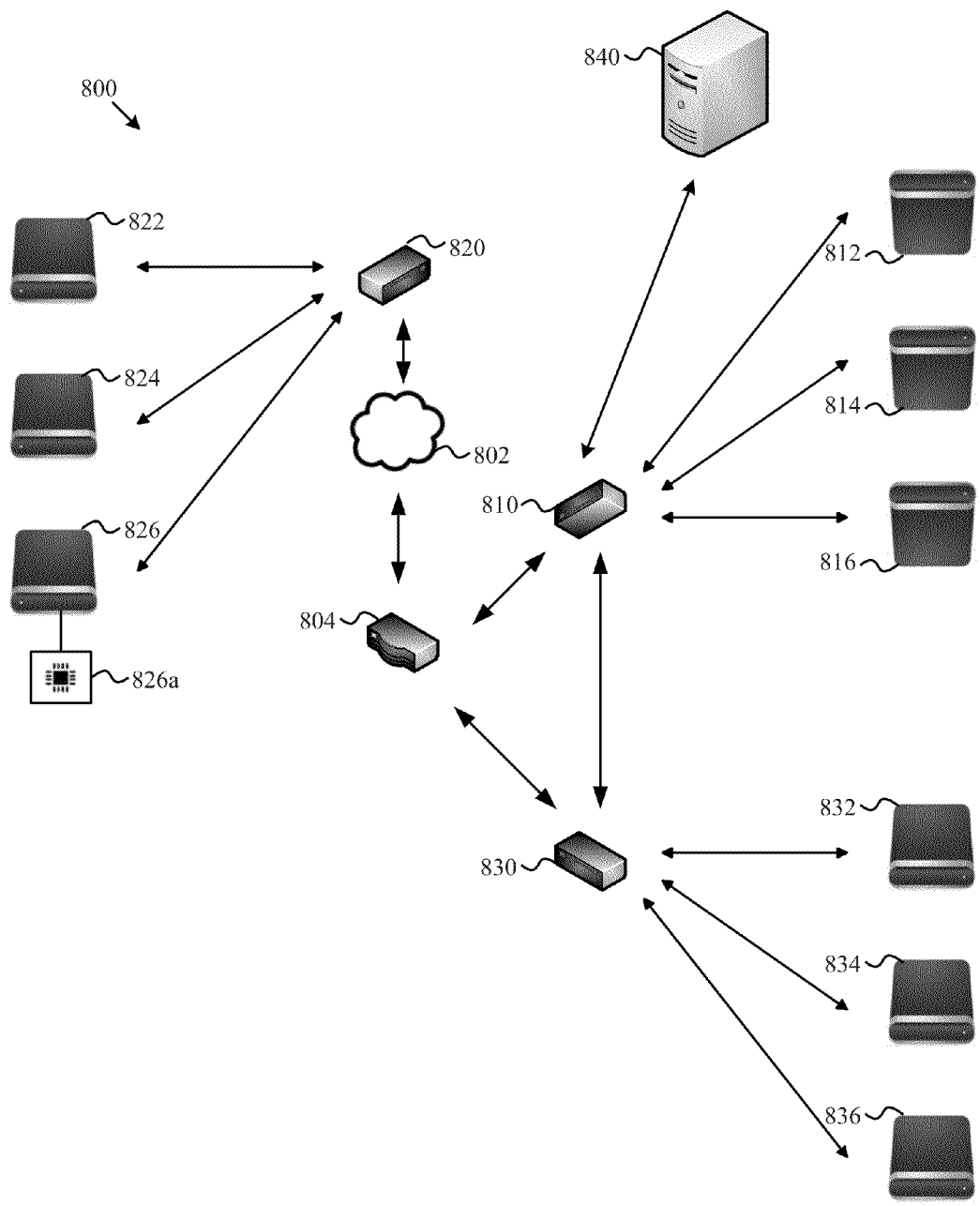
FIG. 8 is a block diagram illustrating a back end of a secure web application implementing a hybrid configuration including fiber channel over Ethernet (FCoE) connections according to one embodiment of the disclosure.

A back end of a network, which hosts web applications or data storage, may including a combination of technologies for accessing and storing data. According to one embodiment, fiber channel over Ethernet (FCoE) may be used in combination with other technologies to achieve improved performance of applications executing on the back end. FIG. 8 is a block diagram illustrating a back end of a secure web application implementing a hybrid configuration including fiber channel over Ethernet (FCoE) connections according to one embodiment of the disclosure. A network 800 includes several switches and/or hubs 810, 820, and 830. Each of the switches 810, 820, and 830 may be coupled through Ethernet, or another networking technology. Storage devices 812-816, 822-826, and 832-836 may be coupled to the switches 810, 820, and 830, respectively. According to one embodiment, the switch 820 and the storage devices 822-826 may be located remote to the secure network behind a gateway 804. The switch 820 may be coupled through a public network 802 to the gateway 804 and other devices on the secure network behind the gateway 804.

The switches 810, 820, and 830 may implement different technologies for connecting to the storage devices 812-816, 822-826, and 832-836. For example, the storage devices 812-816 may be connected to the switch 810 through Ethernet connections. Although Ethernet connects the switch 810 to each of the storage devices 812, 814, and 816, each of the storage devices 812, 814, and 816 may communicate through a different protocol to a server 840 connected to the switch 810. For example, the storage device 812 may communicate through advanced technology attachment (ATA) over Ethernet, and the storage devices 814 and 816 may communicate through fibre channel over Ethernet (FCoE). Other protocols available for communication with a storage device may include internet small computer system interface (iSCSI) and fiber channel protocol. According to one embodiment, the storage device 816 may communicate through fiber connections, such as FICON or ESCON, with the switch 810 while the storage devices 812 and 814 communicate with the switch 810 through Ethernet. Regardless of different physical connections and/or different networking layer protocols employed by the storage devices 812-816, the storage devices 812-816 may employ a common higher-layer protocol for allowing access to files, such as the networking file system (NFS) and/or the common internet file system (CIFS).

The storage devices 812, 814, 816 may be the same of different physical storage format. For example, the storage device 812 may be a tape drive, the storage device 814 may be a hard disk drive (HDD), and the storage device 816 may be a solid state disk (SSD) comprising flash memory. According to one embodiment, at least one of the storage device 812-816 may comprise multiple storage devices of the same or different type in a redundant array of independent disks (RAID).

The storage devices 822-826 and 832-836 may be configured similar to the storage devices 812-816 described above. Further, some or all of the storage devices 812-816, 822-826, and 832-836 may be connected to a secure boot device as described above with reference to FIG. 6 and respond to requests from the server 840 in a method similar to the method described with reference to FIG. 7. For example, the storage device 826 may include an integrated secure boot device 826a.

Figure 9:
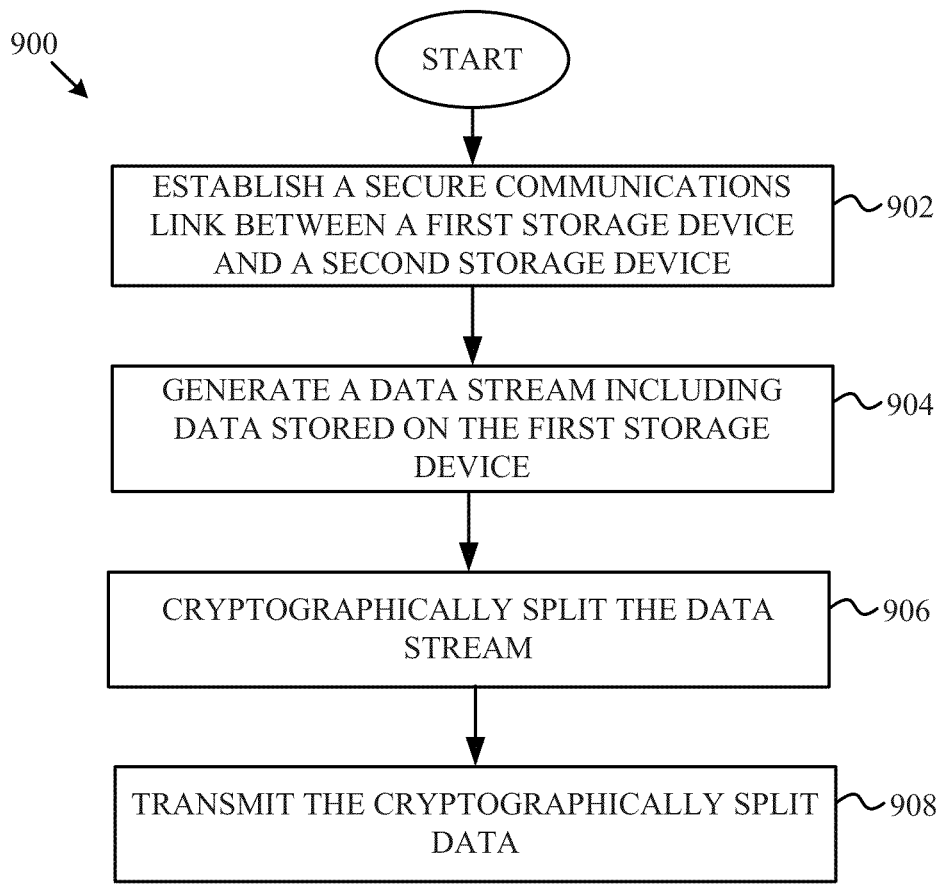
FIG. 9 is a flow chart illustrating an exemplary method for cloning a disk using Network Data Management Protocol (NDMP) according to one embodiment of the disclosure.

When multiple storage devices are present in a network, whether located locally or remotely through a secure connection, data may be cloned to provide additional copies of data. For example, a new storage device may be attached to a network resulting in a copy of select data from one or more other storage devices. In another example, a replacement storage device may be attached to a network resulting is a cloning of data from an existing storage device to the new storage device. According to one embodiment, the cloning is performed through the network data management protocol (NDMP). FIG. 9 is a flow chart illustrating an exemplary method for cloning a disk using network data management protocol (NDMP) according to one embodiment of the disclosure.

A method 900 begins at block 902 with establishing a secure communications link between a first storage device and a second storage device. The secure communications may be created by booting the first storage device from a secure boot device and establishing a connection to a second storage device using an encryption key contained in the secure boot device. The secure communication may be established over an unsecure communications link when the first storage device is located remote from the second storage device.

At block 904, a data stream is generated by the first storage device including data stored on the first storage device. According to one embodiment, during a cloning process all of the data stored on the first storage device is accumulated in the data stream. The data stream may be created through a combination of protocols, such as a data stream formed by network data management protocol (NDMP) at a high level and passed to a transmission control protocol (TCP)/internet protocol (IP) at a lower layer.

According to one embodiment, the data stream may be generated by the first storage device under control of a server. The first storage device may create a second secure connection to the server with the secure boot device. The server may then provide control commands to the first storage device. For example, the first storage device may first establish a secure connection to the server, then, under instruction by the server, begin the method 900 by establishing a second secure connection to a second storage device.

The server may continue to issue commands to the first storage device after the method 900 begins. For example, the server may instruct the first storage device a selection of files for copy to the second storage device. The data stream may be transmitted directly from the first storage device to the second storage device, without transmission of the data to the server, to improve performance of the copy process. The selection of files for transfer from the first storage device to the second storage device may be specified through a wildcard, a regular expression, and/or a filter, such as by specifying an owner of files to transfer.

At block 906, the data stream is cryptographically split, such as by the methods described above with reference to FIGS. 2-4. At block 908, the cryptographically split data stream is transmitted to the second storage device.

Figure 10:
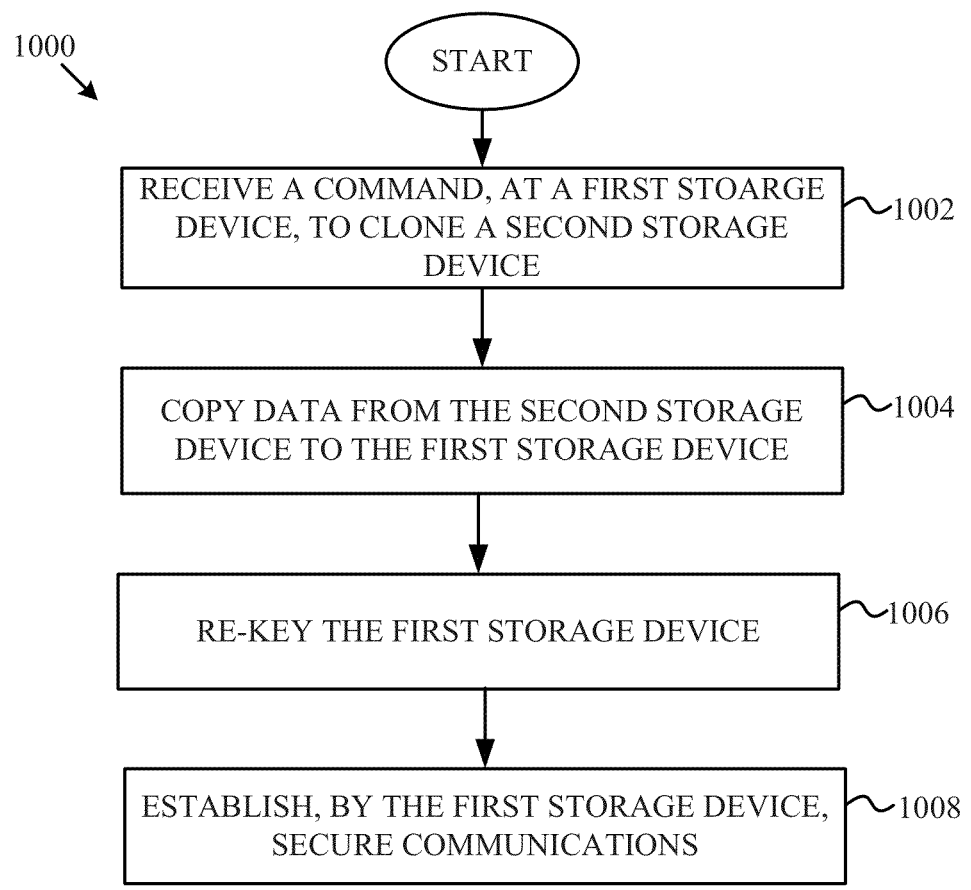
FIG. 10 is a flow chart illustrating an exemplary method for replacing one storage device using re-key processing according to one embodiment of the disclosure.

Physical storage devices having a secure boot device for operating secure connections may have unique encryption keys or encryption certificates for securing data-at-rest (DAR) on the storage device or securing data-in-motion (DIM) transferred to and/or from the physical storage device. When a physical storage device is replaced in a network, a new physical storage device replacing the old physical storage device should be capable of functioning identical to the old physical storage device to reduce down-time in accessibility of the files. Thus, the unique encryption key and/or certificate should be recreated on the new physical storage device to prevent users from requiring new keys and/or certificates to access the new physical storage device. FIG. 10 is a flow chart illustrating an exemplary method for replacing one storage device using re-key processing according to one embodiment of the disclosure. Additionally, the flow chart of FIG. 10 may be implemented for adding a new storage device to a secure data network.

A method 1000 begins at block 1002 with a replacement physical storage device receiving a command to clone an old physical storage device. At block 1004, the replacement physical storage device clones the old physical storage device by coping all data from the old physical storage device. The cloning process may be proceed as described above with reference to FIG. 9. At block 1006, the replacement physical storage device is re-keyed to match the encryption certificate and/or key of the old physical storage device. At block 1008, the replacement physical storage device establishes secure communications using the encryption key and/or certificate generated during the re-keying of block 1006. The secure communications may be established through the method described above with reference to FIG. 1. The replacement physical storage device may then serve data in response to requests from a server by cryptographically splitting data according to the encryption key and/or certificate for transmission as described above with reference to FIGS. 2-4. Re-keying a replacement physical storage device may reduce or eliminate down-time and reconfiguration of users associated with replacement of physical storage devices.

When data is arranged for storage in several storage devices as illustrated in the diagram of FIG. 8, data management may become difficult due to the large number of physical devices. Hosts and applications may require knowledge of which physical device stores a requested file. Tracking files across many physical devices may consume significantly resources and reduce performance of applications or hosts accessing the files stored across multiple physical devices.

Storage virtualization may be used to separate logical storage from physical storage. Logical storage may be presented to the user through a server, which has a mounted or mapped drive, and physical storage may be the actual location of the storage. Storage virtualization may allow the pooling of physical storage devices into what presents as a single storage device that is managed from a central console.

Figure 11:
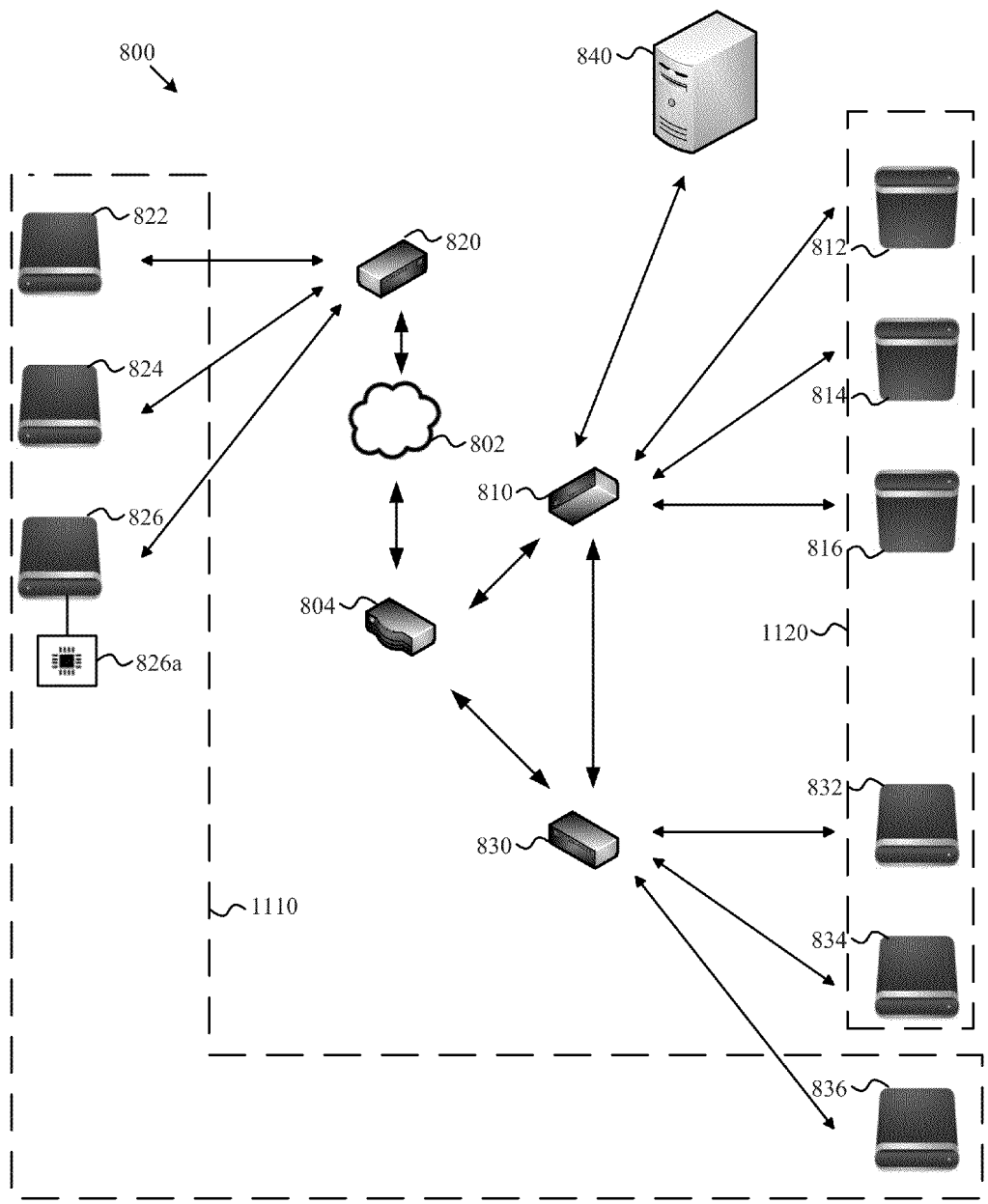
FIG. 11 is a block diagram illustrating an network having multiple storage devices presented as a single storage device according to one embodiment of the disclosure.

FIG. 11 is a block diagram illustrating an network having multiple storage devices presented as a single storage device according to one embodiment of the disclosure. The network 800 is presented in FIG. 11 with the physical storage devices 812-816, 822-826, and 832-836 partitioned into separate logical disks for presentation to a user as a single drive. For example, a first logical partition 1110 may include the physical storage devices 822-826 and 836. According to one embodiment, the first logical partition 1110 may include physical storage devices located local to the server 840 and remote to the server 840, in which the remote physical storage devices may have a secure connection to the server 840 through a secure boot device. A second logical partition 1120 may include the physical storage devices 812-816 and 832-834. Although FIG. 11 shows entire physical storage devices assigned to a logical partition, different files located on a single physical storage device may be assigned to different logical partitions.

The server 840 may store a table identifying the location on a physical storage device of data within each logical partition. Accesses to data in each logical partition may be made through the server 840. When a user requests a first file in the first logical partition 1110 from the server 840, the server 840 may identify the file as stored on the physical storage device 826. The server may then retrieve the file from the physical storage device 826 and deliver the file to the user. According to one embodiment, the server 840 may redirect the user to the physical storage device 826, rather than cache the file on the server 840 for retrieval by the user.

According to one embodiment, one of the physical storage devices within a logical partition may be designated as a server for the logical partition and store the look-up table for mapping files within the logical partition to individual physical storage devices. For example, the physical storage device 826 may be designated as a server for the logical partition 1110. Thus, a request for a file in the logical partition 1110 may be made directly to the logical partition 1110, rather than passing the request to the server 840.

According to one embodiment, storage virtualization may be achieved through block virtualization, which provides seamless data array physical independence and facilitates managing a potentially multi-vendor environment from a single interface within and across datacenters. Block virtualization promotes logical storage flexibility from physical storage such that it may be accessed without regard to physical storage or an underlying heterogeneous structure. This separation allows administrators of the storage system greater flexibility in how they manage storage for end users and also facilitates changing storage vendors should the need arise.

According to another embodiment, storage virtualization may be achieved through file virtualization, which may be provided by network attached storage (NAS) devices. File virtualization may reduce the dependencies between the data accessed at the file level and the location where the files are physically stored. This provides opportunities to optimize storage use and server consolidation and to perform non-disruptive file migrations. These technologies should provide analytics tools that will help determine what subsystems are prime candidates for virtualization and how they should be consolidated.

Figure 12:
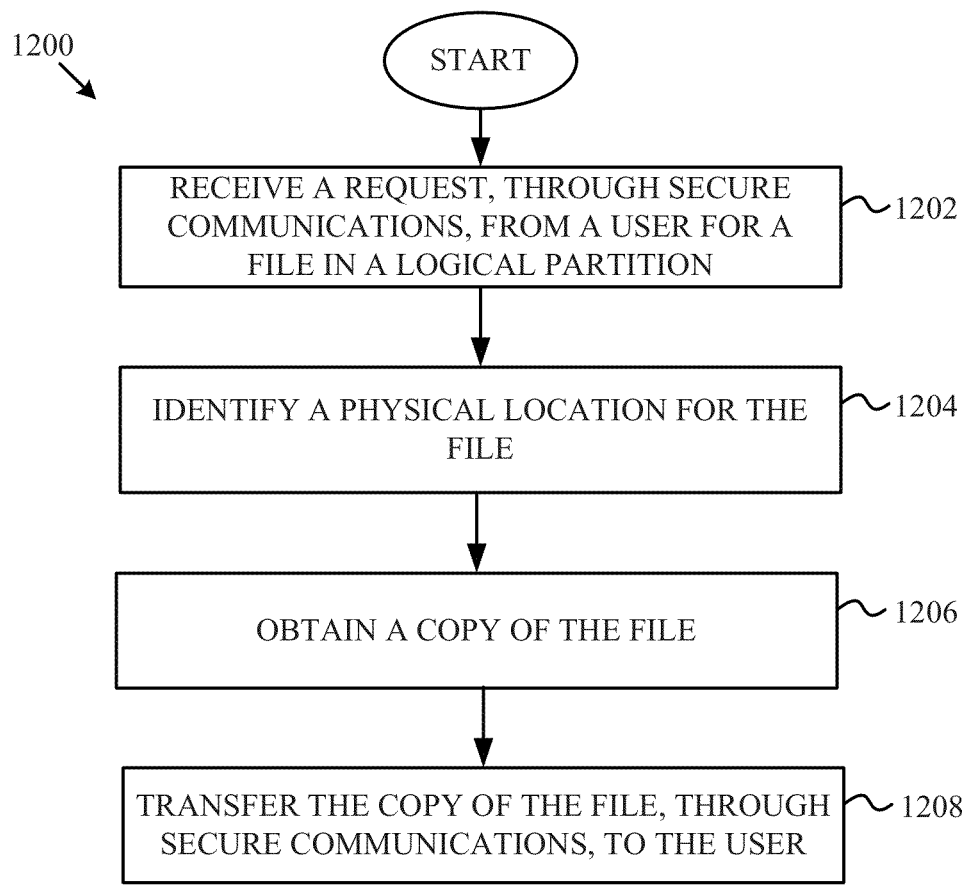
FIG. 12 is a flow chart illustrating an exemplary method for presenting multiple storage device as a single storage device according to one embodiment of the disclosure.

FIG. 12 is a flow chart illustrating an exemplary method for presenting multiple storage device as a single storage device according to one embodiment of the disclosure. A method 1200 begins at block 1202 with receiving, at a server, a request for a file in a logical partition from a user. At block 1204, the server identifies in a look-up table the location of the file within the logical partition. At block 1206, the server obtains a copy of the file from the physical storage device mapped to the file in the look-up table. At block 1208, the server transfers the file to the user requesting the file through secure communications, as described above with reference to FIGS. 2-4.

According to one embodiment, access to storage devices in a logical partition may be accomplished through multipath input/output (MPIO). For example, each of the storage devices may include multiple network adapters. Each network adapter may be coupled through a separate physical connection to the same switch or to a different switch. Likewise, the servers may implement MPIO through multiple network adapters and multiple connections to a switch. MPIO may improve accessibility and reliability of the storage devices and the servers. When one network adapter, switch, or physical connection malfunctions, another path to the storage device or server may be available for establishing secure connections to the storage device or server. Multipath input may allow a storage device or server multiple paths for receiving requests and/or data. Multipath output may allow a storage device or server multiple paths for transmitting requests and/or data. According to one embodiment, multiple paths may be combined, when all paths are functional, to improve performance of a storage device or server by increasing bandwidth available to the server and/or storage device.

Figure 13:
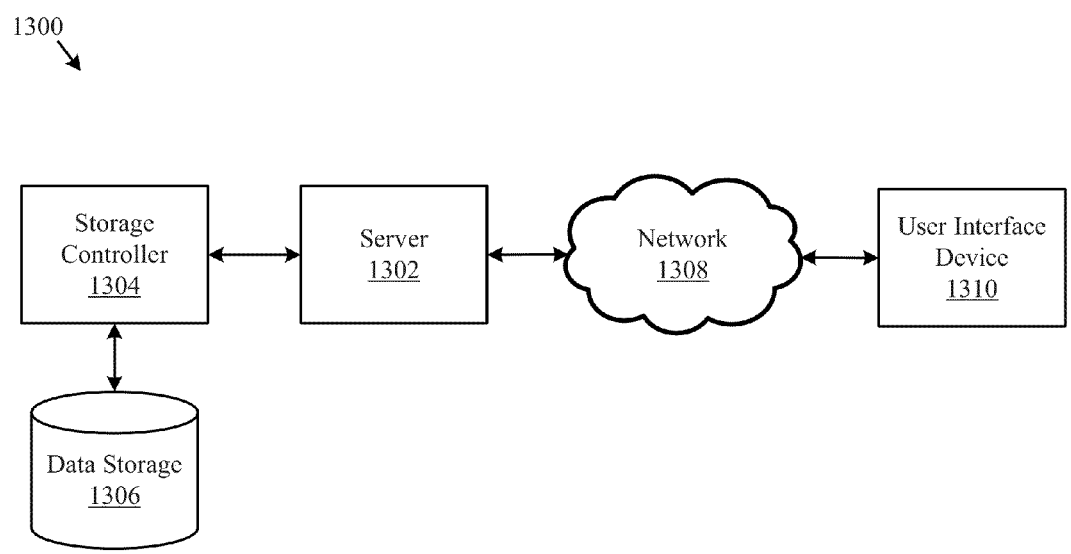
FIG. 13 is block diagram illustrating a computer network according to one embodiment of the disclosure.

FIG. 13 illustrates one embodiment of a system 1300 for an information system. The system 1300 may include a server 1302, a data storage device 1306, a network 1308, and a user interface device 1310. The server 1302 may be a dedicated server or one server in a cloud computing system. In a further embodiment, the system 1300 may include a storage controller 1304, or storage server configured to manage data communications between the data storage device 1306 and the server 1302 or other components in communication with the network 1308. In an alternative embodiment, the storage controller 1304 may be coupled to the network 1308.

In one embodiment, the user interface device 1310 is referred to broadly and is intended to encompass a suitable processor-based device such as a desktop computer, a laptop computer, a personal digital assistant (PDA) or tablet computer, a smartphone or other a mobile communication device having access to the network 1308. When the device 1310 is a mobile device, sensors (not shown), such as a camera or accelerometer, may be embedded in the device 1310. When the device 1310 is a desktop computer the sensors may be embedded in an attachment (not shown) to the device 1310. In a further embodiment, the user interface device 1310 may access the Internet or other wide area or local area network to access a web application or web service hosted by the server 1302 and provide a user interface for enabling a user to enter or receive information.

The network 1308 may facilitate communications of data, such as authentication information, between the server 402 and the user interface device 1310. The network 1308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the user interface device 1310 accesses the server 1302 through an intermediate sever (not shown). For example, in a cloud application the user interface device 1310 may access an application server. The application server fulfills requests from the user interface device 1310 by accessing a database management system (DBMS). In this embodiment, the user interface device 1310 may be a computer or phone executing a Java application making requests to a JBOSS server executing on a Linux server, which fulfills the requests by accessing a relational database management system (RDMS) on a mainframe server.

Figure 14:
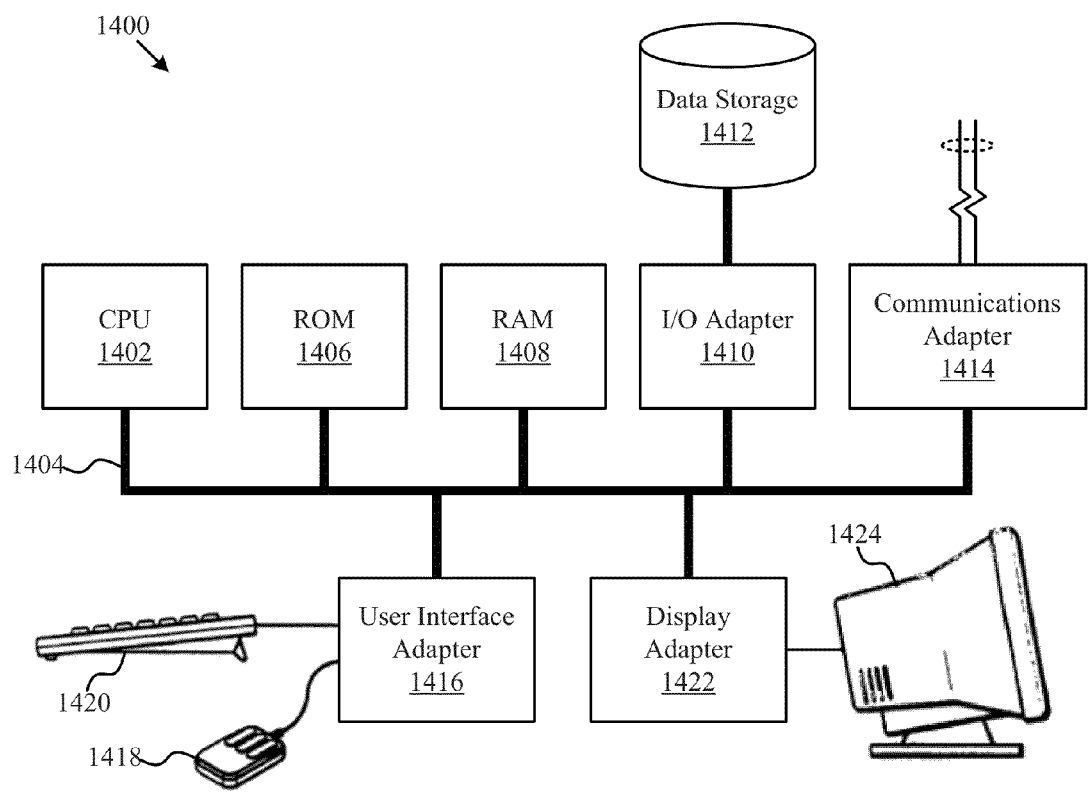
FIG. 14 is a block diagram illustrating a computer system according to one embodiment of the disclosure.

FIG. 14 illustrates a computer system 1400 adapted according to certain embodiments of the server 1302 and/or the user interface device 1310. The central processing unit ("CPU") 1402 is coupled to a system bus 1404. The CPU 1402 may be a general purpose CPU or microprocessor, graphics processing unit ("GPU"), and/or microcontroller. The present embodiments are not restricted by the architecture of the CPU 1402 so long as the CPU 1402, whether directly or indirectly, supports the modules and operations as described herein. The CPU 1402 may execute the various logical instructions according to the present embodiments.

The computer system 1400 also may include random access memory (RAM) 1408, which may be synchronous RAM (SRAM), dynamic RAM (DRAM), and/or synchronous dynamic RAM (SDRAM). The computer system 1400 may utilize RAM 1408 to store the various data structures used by a software application. The computer system 1400 may also include read only memory (ROM) 1406 which may be PROM, EPROM, EEPROM, optical storage, or the like. The ROM may store configuration information for booting the computer system 1400. The RAM 1408 and the ROM 1406 hold user and system data.

The computer system 1400 may also include an input/output (I/O) adapter 1410, a communications adapter 1414, a user interface adapter 1416, and a display adapter 1422. The I/O adapter 1410 and/or the user interface adapter 1416 may, in certain embodiments, enable a user to interact with the computer system 1400. In a further embodiment, the display adapter 1422 may display a graphical user interface (GUI) associated with a software or web-based application on a display device 1424, such as a monitor or touch screen.

The I/O adapter 1410 may couple one or more storage devices 1412, such as one or more of a hard drive, a flash drive, a compact disc (CD) drive, a floppy disk drive, and a tape drive, to the computer system 1400. The communications adapter 1414 may be adapted to couple the computer system 1400 to the network 1308, which may be one or more of a LAN, WAN, and/or the Internet. The communications adapter 1414 may also be adapted to couple the computer system 1400 to other networks such as a global positioning system (GPS) or a Bluetooth network. The user interface adapter 1416 couples user input devices, such as a keyboard 1420, a pointing device 1418, and/or a touch screen (not shown) to the computer system 1400. The keyboard 1420 may be an on-screen keyboard displayed on a touch panel. Additional devices (not shown) such as a camera, microphone, video camera, accelerometer, compass, and or a gyroscope may be coupled to the user interface adapter 1416. The display adapter 1422 may be driven by the CPU 1402 to control the display on the display device 1424.

The applications of the present disclosure are not limited to the architecture of computer system 1400. Rather the computer system 1400 is provided as an example of one type of computing device that may be adapted to perform the functions of a server 1302 and/or the user interface device 1310. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   reading information from a secure boot device;
   executing an operating system contained on the secure boot device;
   establishing a secure connection to a server within a unified server infrastructure over a remote communications link using a first protocol;
   receiving a request for data from the server;
   cryptographically splitting the requested data; and
   transmitting the cryptographically split data to the server;
   wherein the unified server architecture comprises:
     a communications switch;
     a backend component; and
     the server coupled to the communications switch and the backend component over a local communications link using a second protocol.

2. The method of claim 1, in which the information from the secure boot device is read by the back end component.

3. The method of claim 2, in which the back end component is a storage device.

4. The method of claim 2, in which back end component is remotely located to the server.

5. The method of claim 1, in which the step of reading information from the secure boot device comprises reading information from a universal serial bus (USB) drive.

6. The method of claim 1, in which the step of reading information from the secure boot device comprises reading information from an integrated component.

7. A computer program product, comprising:
   a non-transitory computer readable medium comprising:
     code to read information from a secure boot device;
     code to execute an operating system contained on the secure boot device;
     code to establish a secure connection to a server within a unified server infrastructure over a remote communications link using a first protocol;
     code to receive a request for data from the server;
     code to cryptographically split the requested data; and
     code to transmit the cryptographically split data to the server;
   wherein the unified server architecture comprises:
     a communications switch;
     a backend component; and
     the server coupled to the communications switch and the backend component over a local communications link using a second protocol.

8. The computer program product of claim 7, in which the information from the secure boot device is read by the back end component.

9. The computer program product of claim 8, in which the back end component is a storage device.

10. The computer program product of claim 8, in which back end component is remotely located to the server.

11. The computer program product of claim 7, in which the code to read information from the secure boot device comprises code to read information from a universal serial bus (USB) drive.

12. The computer program product of claim 7, in which the code to read information from the secure boot device comprises code to read information from an integrated component.

13. The computer program product of claim 7, in which the computer readable medium is integrated into a network attached storage (NAS) device.

14. An computing apparatus, comprising:
   a processor;
   a memory coupled to the processor; and
   a secure boot device coupled to the processor,
   in which the processor is configured:
     to read information from the secure boot device;
     to execute an operating system contained on the secure boot device;
     to establish a secure connection to a server within a unified server infrastructure over a remote communications link using a first protocol;
     to receive a request for data stored in the memory from the server;
     to cryptographically split the requested data; and
     to transmit the cryptographically split data to the server;
   wherein the unified server architecture comprises:
     a communications switch;
     a backend component; and
     the server coupled to the communications switch and the backend component over a local communications link using a second protocol.

15. The apparatus of claim 14, in which the apparatus is the back end component.

16. The apparatus of claim 15, in which the back end component is a storage device.

17. The apparatus of claim 15, in which back end component is remotely located to the server.

18. The apparatus of claim 17, further comprising a public network interface adapter, in which the processor is configured to transmitted the cryptographically split data through the public network interface adapter.

19. The apparatus of claim 14, in which the apparatus further comprises a universal serial bus (USB) interface coupling the secure boot device to the processor, in which the processor is configured to read information from the universal serial bus (USB).

20. The apparatus of claim 14, in which the secure boot device is integrated into the apparatus.

* * * * *